United States Patent
Gahleitner et al.

(10) Patent No.: US 11,440,300 B2
(45) Date of Patent: Sep. 13, 2022

(54) MULTILAYER POLYPROYLENE FILM

(71) Applicant: BOREALIS AG, Vienna (AT)

(72) Inventors: Markus Gahleitner, Linz (AT); Jingbo Wang, Linz (AT); Friedrich Berger, Linz (AT); Manfred Gruenberger, Linz (AU)

(73) Assignee: BOREALIS AG, Vienna (AT)

( * ) Notice: Subject to any disclaimer, the term of this patent is extended or adjusted under 35 U.S.C. 154(b) by 47 days.

(21) Appl. No.: 17/253,872

(22) PCT Filed: Jul. 22, 2019

(86) PCT No.: PCT/EP2019/069682
§ 371 (c)(1),
(2) Date: Dec. 18, 2020

(87) PCT Pub. No.: WO2020/020825
PCT Pub. Date: Jan. 30, 2020

(65) Prior Publication Data
US 2021/0362479 A1    Nov. 25, 2021

(30) Foreign Application Priority Data

Jul. 23, 2018  (EP) .................................... 18184920

(51) Int. Cl.
| | | |
|---|---|---|
| *B32B 27/08* | (2006.01) | |
| *B32B 27/30* | (2006.01) | |
| *B32B 27/32* | (2006.01) | |
| *C08F 210/06* | (2006.01) | |
| *B29C 48/00* | (2019.01) | |
| *B29C 48/08* | (2019.01) | |
| *B29C 48/21* | (2019.01) | |
| *B29K 23/00* | (2006.01) | |
| *B29K 105/00* | (2006.01) | |

(52) U.S. Cl.
CPC ............ *B32B 27/08* (2013.01); *B32B 27/302* (2013.01); *B32B 27/32* (2013.01); *C08F 210/06* (2013.01); *B29C 48/022* (2019.02); *B29C 48/08* (2019.02); *B29C 48/21* (2019.02); *B29K 2023/14* (2013.01); *B29K 2105/0085* (2013.01); *B29K 2105/0094* (2013.01); *B32B 2250/03* (2013.01); *B32B 2250/246* (2013.01); *B32B 2270/00* (2013.01); *B32B 2274/00* (2013.01); *B32B 2307/31* (2013.01); *B32B 2307/414* (2013.01); *B32B 2307/546* (2013.01); *B32B 2307/732* (2013.01); *B32B 2439/40* (2013.01)

(58) Field of Classification Search
CPC ...... C08F 10/06; C08F 210/06; C08F 210/16; C08F 2500/12; C08F 2500/27; C08F 2500/34; C08F 2500/35; C08F 2500/17; C08F 2500/26; C08F 2/001; C08F 4/6465; C08F 4/651; C08F 4/6546; C08F 110/06; C08L 23/12; C08L 23/16; C08L 53/025; B29C 48/022; B29C 48/08; B29C 48/21; B29K 2023/14; B29K 2105/0085; B29K 2105/0094; B32B 2250/03; B32B 2250/246; B32B 2270/00; B32B 2274/00; B32B 2307/306; B32B 2307/308; B32B 2307/31; B32B 2307/40; B32B 2307/412; B32B 2307/414; B32B 2307/546; B32B 2307/732; B32B 2439/00; B32B 2439/40; B32B 2439/80; B32B 25/08; B32B 27/06; B32B 27/08; B32B 27/30; B32B 27/302; B32B 27/32
See application file for complete search history.

(56) References Cited

FOREIGN PATENT DOCUMENTS

| | | | |
|---|---|---|---|
| DE | 202013103803 | U1 | 11/2014 |
| EP | 0892830 | B1 | 8/2003 |
| EP | 1728626 | A1 | 12/2006 |
| EP | 1661935 | B1 | 12/2007 |

(Continued)

OTHER PUBLICATIONS

Fromme, Hermann, et al., "Occurrence of phthalates and bisphenol A and Fin the environment", Water Research 36 (2002) 1429-1438.
Busico, Vincenzo, et al., "Alk-1-ene Polymerization in the Presence of a Monocyclopentadienyl Zirconium(IV)Acetamidinate Catalyst: Microstructural and Mechanistic Insights" Macrol. Rapid Commun. 2007, 28, 1128-1134.
Cheng, H.N., etaL, "13C NMR Analysis of Ethylene-Propylene Rubbers", Macromolecules 184, 17, 1950-1955.
European Search Report dated Nov. 19, 2018.

(Continued)

*Primary Examiner* — Lawrence D Ferguson
(74) *Attorney, Agent, or Firm* — Tarolli, Sundheim, Covell & Tummino LLP

(57) ABSTRACT

Multilayer film comprising at least a skin layer, a core layer and an inner layer, the skin layer comprising a homo polypropylene or a random propylene ethylene copolymer including up to 2.5 wt.-% units derived from ethylene, the homopolypropylene or the random propylene ethylene copolymer having a MFR2 (ISO1 133, 230° C.) of 2.0 to 20 g/10 min and a melting temperature (Tm) of above 148° C. measured by DSC according to ISO 11357-3:1999 and a scan rate of 10° C./min; the core layer comprising a mixture obtainable by melt blending 20 to 100 wt.-% of a random heterophasic copolymer and 0 to 80 wt.-% of styrene based TPE, whereby the random heterophasic copolymer has a melting temperature (Tm) of 134° C.-148° C. measured by DSC according to ISO 11357-3:1999 and a scan rate of 10° C./min and includes a propylene ethylene copolymer rubber; and whereby the styrene based TPE has a styrene content of from 5 to 20 wt.-%, and the inner layer comprising a random propylene ethylene copolymer having a melting temperature (Tm) from 132° C. to 144° C. measured by DSC according to ISO 11357-3:1999 and a scan rate of 10° C./min, wherein the multilayer film is free of phthalic acid esters as well as decomposition products thereof.

15 Claims, No Drawings

(56) References Cited

FOREIGN PATENT DOCUMENTS

| | | |
|---|---|---|
| EP | 2415790 B1 | 2/2012 |
| EP | 2546298 B1 | 1/2013 |
| EP | 2610270 B1 | 7/2013 |
| EP | 2610271 B1 | 7/2013 |
| EP | 2610272 B1 | 7/2013 |
| EP | 2831168 B1 | 2/2015 |
| EP | 3015503 A1 | 5/2016 |
| EP | 3078490 A1 | 10/2016 |
| EP | 3315551 A1 | 5/2018 |
| EP | 3348396 A1 | 7/2018 |
| WO | 2010/0117148 A2 | 10/2010 |
| WO | 2010/117150 A2 | 10/2010 |
| WO | 2012/007430 A1 | 1/2012 |
| WO | 2017/19866 A1 | 2/2017 |
| WO | 2019038395 A1 | 2/2019 |
| WO | 2020245251 A2 | 12/2020 |

OTHER PUBLICATIONS

Kakugo, Masahiro, et al., "13C NMR Determination of Monomer Sequence Distribution in Ethylene-Propylene Copolymers Prepared with d-TiC13-Al(C2H5)2Cl", Macromolecules 1982, 15, 1150-1152.

Resconi, Luigi, et al., "Selectivity in Propene Polymerization with Metallocene Catlysts", Chem Rev. 2000, 100, 1253-1345.

Singh, Gurmeet, et al., "Triad sequence determination of ethylene—propylene copolymers—application of quantitative 13C NMR" Polymer Testing 28 (2009) 475-479.

Wang. Wen-Jun, et al., "Structural Analysis of Ethylene/Propylene Copolymers Synthesized with a Constrained Geometry Catalyst", Macromolecules 2000, 33 1157-1162.

Zhou, Zhe, et al., "A new decoupling method for accurate quantification of polyethylene copolymer composition and triad sequence distribution with 130 NMR" Journal of Magnetic Resonance 187 (2007) 225-233.

Applicant: Borealis AG; European Application No. 19740407.2; European Office Action dated Feb. 8, 2022; 5 pgs.

US 11,440,300 B2

MULTILAYER POLYPROYLENE FILM

FIELD OF THE INVENTION

The instant invention relates to polypropylene soft multilayer films having good optical properties, method for producing the same and use thereof.

BACKGROUND

Polymers, especially polypropylene, are widely used film, particularly in medical pouch systems due to their excellent performance, such as softness, transparency, and biocompatibility with human beings and animals. The currently used polypropylene based films and pouches suffer from limitations as regards transparency especially after sterilization. There is further a tendency to avoid any potentially health and environmentally harmful compounds such as phthalic acid esters. Recently this has been addressed by phthalate free catalyst systems. However, for multilayer film compatibility constitutes a major problem. In a further aspect, heterophasic propylene copolymers (RAHECO) being produced with phthalate free catalysts turned out to have rather high absolute haze before and also after sterilization when compared with the best in class heterophasic propylene copolymers derived from traditional phthalate containing catalysts.

U.S. Pat. No. 7,537,829 B2 concerns a multi-layer film for packaging, comprising a core layer containing a core polymer and a soft polymer, a tie layer comprising a tie layer polymer such as a C2C8 alpha olefin and a sealant layer. The exemplified films comprise soft Adflex grades and are non-transparent.

WO 2010117148 A2 and WO 2010117150 A2 concern three-layer film constructions with an outer layer of PP (homo- or copolymer) and a central layer of 10-60 wt % of PP copolymer and 40-90 wt % thermoplastic elastomer (TPE; chosen from hydrogenated styrene-isoprene-butadiene (SIBS) copolymer, hydrogenated styrene-butadiene-styrene (SBS) copolymer, hydrogenated styrene-isoprene-styrene (SIS) copolymer, hydrogenated styrene-ethylene-butadiene-styrene (SEBS) copolymer, hydrogenated styrene-ethylene-propylene-styrene (SEPS) copolymer, hydrogenated styrene-ethylene-ethylene-propylene-styrene (SEEPS) copolymer, hydrogenated styrene-butadiene (SBC) copolymer, hydrogenation styrene-ethylene-propylene-styrene (SBPS) copolymer and their combination), and an inner layer of PP (homo- or copolymer), 10-30 wt % LLDPE and 1-10 wt % TPE. The LLDPE comprised in the inner layer constitutes a major problem for high temperature applications.

EP 2546298 B1 concerns monolayer unoriented film comprising at least 70 wt.-% of an heterophasic propylene copolymer (RAHECO), said RAHECO comprising a matrix (M) being a random propylene copolymer (R-PP) and an elastomeric propylene copolymer (E) dispersed in said matrix (M), wherein the RAHECO has (a) an MFR2 (230° C.) measured according to ISO 1133 in the range of 2.0 to 15.0 g/10 min, (b) a melting temperature melting temperature (Tm) determined by differential scanning calorimetry (DSC) in the range of 130 to 150° C., (c) a xylene cold soluble content (XCS) determined according ISO 16152 (25° C.) in the range of 25 to 50 wt.-%, (d) a comonomer content in the range of 10.0 to 15.0 wt.-%, wherein further the xylene cold soluble content (XCS) of the heterophasic propylene copolymer (RAHECO) has (e) a comonomer content in the range of 20 to 30 wt.-% and (f) an intrinsic viscosity (IV) determined according to DIN ISO 1628/1, (in Decalin at 135° C.) in the range of 0.8 to below 2.0 dl/g.

EP 2831168 B1 describes discloses three layer film having an outer layer, core layer and a sealing layer. The core layer has been described to be layer (L1), said layer (L1) comprises at least 70 wt.-% of a polymer composition (Co), said composition (Co) comprises (a) a propylene copolymer (A) having (a1) a melt flow rate MFR2 (230° C.) measured according to ISO 1133 in the range of more than 2.0 to 15.0 g/10 min, (a2) a comonomer content in the range of more than 7.5 to 16.5 wt.-%, and (a3) a xylene cold soluble content (XCS) determined according ISO 16152 (25° C.) in the range of 25.0 to 55.0 wt.-%, wherein (a4) the comonomer content of xylene cold soluble (XCS) fraction of the propylene copolymer is in the range of 14.0 to 30.0 wt.-%, and (b) a styrenic based elastomer(s) (B) having a styrene content in the range of 5 to equal or below 15 wt.-%, wherein the polypropylene (A) has a melting temperature in the range of 145 to 160° C. The haze values reported still show room for optimization.

WO2017/19866 concerns heterophasic propylene copolymers (RAHECO) being made with a phthalate free catalyst for use in polypropylene film, particularly medical packaging film having good softness but unfortunately somewhat deteriorated haze when compared with similar heterophasic propylene copolymers being made by traditional phthalate containing catalysts.

Moreover traditional material show a conflict of aims when styrene based TPEs are added to heterophasic propylene copolymers (RAHECOs) as the balance of softness and haze is limited.

Thus, there is still the need for a multilayer film having even better haze at retained low, desirable softness and being phthalate free.

SUMMARY OF THE INVENTION

The present invention is based on the surprising finding that this object can be achieved by using polymers obtained from Ziegler Natta catalyst having internal citraconate donors.

The present invention therefore provides
a multilayer film comprising at least a skin layer, a core layer and an inner layer,
  the skin layer comprising a homo polypropylene or a random propylene ethylene copolymer including up to 2.5 wt.-% units derived from ethylene, the homopolypropylene or the random propylene ethylene copolymer having a MFR$_2$ (ISO1133, 230° C.) of 2.0 to 20 g/10 min and a melting temperature (Tm) of above 148° C. measured by DSC according to ISO 11357-3:1999 and a scan rate of 10° C./min;
  the core layer comprising a mixture obtainable by melt blending
  20 to 100 wt.-% of a random heterophasic copolymer and 0 to 80 wt.-% of styrene based TPE,
  whereby the random heterophasic copolymer has a melting temperature (Tm) of 134° C.-148° C. measured by DSC according to ISO 11357-3:1999 and a scan rate of 10° C./min and includes a propylene ethylene copolymer rubber; and
  whereby the styrene based TPE has a styrene content of from 5 to 20 wt.-%, and
  the inner layer comprising a random propylene ethylene copolymer having a melting temperature (Tm) from 132° C. to 144° C. measured by DSC according to ISO 11357-3:1999 and a scan rate of 10° C./min, wherein the multilayer film is free of phthalic acid esters as well as decomposition products thereof.

It is self-explaining, when a styrene based TPE is not present, the present invention provides a multilayer film comprising at least a skin layer, a core layer and an inner layer, the skin layer comprising a homo polypropylene or a random propylene ethylene copolymer including up to 2.5 wt.-% units derived from ethylene, the homopolypropylene or the random propylene ethylene copolymer having a $MFR_2$ (ISO1133, 230° C.) of 2.0 to 20 g/10 min and a melting temperature (Tm) of above 148° C. measured by DSC according to ISO 11357-3:1999 and a scan rate of 10° C./min;

the core layer comprising a random heterophasic copolymer, whereby the random heterophasic copolymer has a melting temperature (Tm) of 134° C.-148° C. measured by DSC according to ISO 11357-3:1999 and a scan rate of 10° C./min and includes a propylene ethylene copolymer rubber; and the inner layer comprising a random propylene ethylene copolymer having a melting temperature (Tm) from 132° C. to 144° C. measured by DSC according to ISO 11357-3:1999 and a scan rate of 10° C./min, wherein the multilayer film is free of phthalic acid esters as well as decomposition products thereof.

In a particularly preferred aspect, the multilayer film according to present invention is further characterized in that the random heterophasic copolymer forming, together with styrene based TPE, the core layer has a xylene cold soluble fraction (XCS) having an intrinsic viscosity of 1.0 to 2.0 dl/g (DIN ISO 1628/1, 10/1999; Decalin, 135° C.). This IV(XCS) concerns the random heterophasic copolymer before melt-blending with the optional styrene based TPE.

It is further preferred that the multilayer film according to the present invention is further characterized in that the random heterophasic copolymer of the core layer is a random heterophasic copolymer of propylene.

"Free of phthalic acid esters as well as decomposition products thereof" indicates absence of such components within the well accepted understanding in the art. "Free of phthalic acid esters as well as decomposition products thereof" indicates a maximum of 10 µg/kg, i.e. 10 ppb by weight. Such values have been reported for common soil and river sediments. It is well known for many years that the actual detection limit is lower than the environmental background concentration. Attention is drawn to H. Fromme, T. Küchler, T. Otto, K. Pilz, J. Müller, A. Wenzel Water Research 36 (2002) 1429-1438 which is incorporated by reference herewith. Detection is straightforward by gas chromatography coupled with one- or two dimensional mass spectrometry (GC-MS respectively GC-MS/MS) optionally preceded by enrichment on a suitable adsorption material.

Propylene ethylene copolymers denote copolymers containing at least 50 mol-% of units derived from propylene. Ethylene propylene copolymers denote copolymers containing at least 50 mol-% of units derived from ethylene. A random heterophasic copolymer denotes a copolymer comprising two distinctive phases, namely a matrix phase and dispersed therein an elastomer phase, whereby the matrix phase is formed by a random propylene ethylene copolymer. Heterophasic nature can be identified by the presence of at least two distinct glass transition temperatures. The abbreviation TPE stands for thermoplastic elastomer. A styrene based TPE denotes a styrenic block copolymer having a basic structure A-B-A, whereby A stands for polystyrene and B stands for an elastomeric phase. A typical example is SEBS, i.e. styrene ethylene butylene styrene block copolymer.

The multilayer film according to the present invention preferably has a total thickness of 70 to 500 micrometer, preferably 100 to 400 micrometer, more preferably 120 to 300 micrometer, even more preferably 150 to 250 micrometer and most preferably 180 to 200 micrometer.

In a further aspect, the multilayer film is characterized by a specific film layer thickness distribution. The core layer preferably has a thickness of 60 to 90% with respect to the thickness of the multilayer film. The percentage given insofar pertains to the individual layer thickness versus the total multilayer film thickness. The core layer more preferably has a thickness of 70 to 85% with respect to the thickness of the multilayer film, most preferably 75 to 80% with respect to the thickness of the multilayer film. It should be understood any of these percentages given may be combined with any of the preferred total thickness values as given above. The combination of preferred thicknesses and preferred percentages of the same level is however particularly preferred.

In yet a further aspect, the thicknesses of the skin layer is preferably 5 to 20%, more preferably 10 to 15% with respect to the thickness of the multilayer film. Independent therefrom the thicknesses of the inner layer is preferably 5 to 20%, more preferably 10 to 15% with respect to the thickness of the multilayer film. Most preferably the skin layer and the inner layer have the same percentage with respect to the thickness of the multilayer film, i.e. both have 5 to 20%, more preferably 10 to 15% with respect to the thickness of the multilayer film.

It is possible that one or more of the layers, i.e. skin layer, core layer and/or inner layer splits into two or even more sub-layers. In such case, the thickness shall indicate the total thickness of the respective sub-layers. In a further aspect, the multilayer film according to the present invention preferably consists of three layers, namely skin layer, core layer and inner layer. Any of these three layers may split into two or more sub-layers.

The skin layer preferably consists of the homo polypropylene or random propylene ethylene copolymer as defined herein. This means presence of further polymeric components in substantial amounts is preferably excluded. However, the presence of stabilizers in an amount of up to 3 wt.-% with respect the total weight of the skin layer and/or the presence of further polymeric components in an amount of up to 3 wt.-% with respect the total weight of the skin layer shall be possible. In other words, "skin layer preferably consists of the homo polypropylene or random propylene ethylene copolymer as defined herein" as a matter of definition also allows the presence of up to 3 wt.-% stabilizers and/or up to 3 wt.-% polymeric components. As a typical example for a further polymeric component used in minor amounts of for example 1 wt.-% masterbatch polymer(s) may be mentioned.

The core layer preferably comprises, more preferably consists of the mixture obtainable by melt blending 20 to 95 wt.-% of a random heterophasic copolymer and 5 to 80 wt.-% of styrene based TPE. The core layer preferably consists of the mixture obtainable by melt blending 20 to 100 wt.-% of a random heterophasic copolymer, more preferably by melt blending 20 to 95 wt.-% of a random heterophasic copolymer and 0 to 80 wt.-% of styrene based TPE, more preferably 5 to 80 wt.-% of styrene based TPE. Again the presence of further polymeric components in substantial amounts is preferably excluded. Particularly, the presence of stabilizers in an amount of up to 3 wt.-% with respect the total weight of the core layer shall be possible and/or the presence of further polymeric components in an amount of up to 3 wt.-% with respect the total weight of the skin layer shall be possible and within the meaning of "consists of" as a matter of definition.

The core layer more preferably comprises, yet more preferably consists of the mixture obtainable by melt blending 40 to 91 wt.-% of a random heterophasic copolymer and 9 to 60 wt.-% of styrene based TPE. Such ratio contributes to an excellent balance of tensile and haze properties. It is a particularly surprising finding of the present invention that addition of a styrene based TPE does not deteriorate haze but improves both, softness and haze. The core layer still more preferably comprises, yet still more preferably consists of the mixture obtainable by melt blending 45 to 80 wt.-% of a random heterophasic copolymer and 20 to 55 wt.-% of styrene based TPE. Such ratio even further improves the balance of tensile and haze. The core layer most preferably comprises, yet still most preferably consists of the mixture obtainable by melt blending 45 to 65 wt.-% of a random heterophasic copolymer and 35 to 55 wt.-% of styrene based TPE.

The inner layer preferably consists of the random propylene ethylene copolymer, or alternatively and also preferably consists of a mixture obtainable by blending the random propylene ethylene copolymer and a propylene ethylene elastomer having an ethylene content of less than 20 wt.-% with respect to the weight of said propylene ethylene elastomer. In yet an alternative embodiment the inner layer consists of a mixture obtainable by blending the random propylene ethylene copolymer and a styrene ethylene butylene styrene copolymer (SEBS). Again "consists of" shall exclude the presence of further polymeric components in substantial amounts but shall allow presence of stabilizers in an amount of up to 3 wt.-% with respect the total weight of the inner layer and/or the presence of further polymeric components in an amount of up to 3 wt.-% with respect the total weight of the inner layer as a matter of definition.

The polymer used for the skin layer can be a polypropylene homopolymer or a random propylene ethylene copolymer, whereby the random propylene ethylene copolymer of the skin layer has an ethylene content of less than 2.5 wt.-%. Polypropylene homopolymer are preferred. It is further preferred that the polypropylene homopolymer has a melting temperature (Tm) of above 160° C., more preferably above 162° C. and most preferably above 164° C.

Details of the measurement of melting temperature (Tm) are given in the experimental part in detail.

When a random propylene ethylene copolymer is present, the ethylene content is preferably 0.5 to 2.2 wt.-% and most preferably are 0.8 to 2.0 wt.-%. It is further preferred that the random propylene ethylene copolymer has a melting temperature (Tm) in the range 148-160° C. more preferably 152-155° C.

In a further aspect, the propylene homopolymer or the random propylene ethylene copolymer of the skin layer has an MFR (230° C., 2.16 kg, ISO1133) of 2.0 to 20 g/10 min, preferably 3.0 to 15 g/10 min and most preferably 4.0 to 13 g/10 min.

In yet a further aspect, the propylene homopolymer or the random propylene ethylene copolymer of the skin layer preferably has a flexural modulus of above 900 MPa more preferably above 950 MPa, most preferably above 975 MPa, when measured on injection molded specimens (23° C., 50% humidity, ISO 178). If a propylene homopolymer is used, the flexural modulus is preferably above 1450 MPa when measured on injection molded specimens (23° C., 50% humidity, ISO 178).

The styrene based TPE as used for the core layer has a styrene content of from 5 to 20 wt.-%, preferably 5 to 15 wt.-% and more preferably 5 to 10 wt.-% and most preferably 5 to 9 wt.-%. The maximum of 20 wt.-% for the styrene is highly important as the number average particle size of the TPO-TPE blend increases drastically which in turn deteriorates haze properties.

The random heterophasic copolymer as used for the core layer is further preferably characterized by a melt flow rate (MFR) (ISO 1133; 230° C.; 2.16 kg) in the range of 0.5 to 20.0 g/10 min, preferably in the range of 1.0 to 15.0 g/10 min, more preferably in the range of 2.0 to 10.0 g/10 min, even more preferably in the range of 3.0 to 7.0 g/10 min and most preferably in the range of 3.5 to 6.5 g/10 min.

In a further aspect, the random heterophasic copolymer as used for the core layer preferably has a total ethylene comonomer content in the range of 5.0 to 16.0 wt %, preferably in the range of 6.0 to 15.0 wt % and more preferably in the range of 7.0 to 14.0 wt %.

The amount of the xylene cold soluble (XCS) fraction of the random heterophasic copolymer as used for the core layer preferably is in the range of 15.0 to 30.0 wt %, more preferably in the range of 18.0 to 30.0 wt % and most preferably in the range of 18.0 to 25.0 wt %.

The intrinsic viscosity (IV) measured according to ISO 1628-1 (at 135° C. in decaline) of the XCS fraction of the random heterophasic copolymer as used for the core layer is in the range of more than 1.0 to 2.0 dl/g, preferably in the range of 1.1 to 1.8 dl/g and more preferably in the range of 1.2 to 1.6 dl/g.

In addition the random heterophasic copolymer as used for the core layer the core layer has a melting temperature in the range of 134° C. to 148° C. Preferably the melting temperature of the random heterophasic copolymer as used for the core layer is in a range from 138° C. to below 146° C., more preferably in the range from 140° C. to 145° C.

The propylene ethylene copolymer as used for the inner layer has a melting temperature (Tm) from 132° C. to 144° C. It is further preferred the propylene ethylene copolymer as used for the inner layer has an ethylene content of 3.5 to 6.0 wt.-%, more preferably 3.6 to 5.0 wt.-%, most preferably 3.7 to 4.8 wt.-%.

In a further aspect, the propylene ethylene copolymer as used for the inner layer has a melt flow rate of 2.0 to 20 g/10 min, more preferably 4.0 to 15.0 and most preferably 6.0 to 13.0 g/10 min (230° C., 2.16 kg, ISO1133).

In yet a further aspect, the propylene ethylene copolymer as used for the inner layer preferably has a flexural modulus of from 500 to 1200 MPa, more preferably 500 to 1000 MPa and most preferably 600 to 900 MPa when measured on injection molded specimens (23° C., 50% humidity, ISO 178).

As mentioned above, the inner layer comprises, preferably consists of the random propylene ethylene copolymer as described herein. Alternatively the inner layer comprises, preferably consists of a mixture obtainable by blending the random propylene ethylene copolymer as described herein and a propylene ethylene elastomer having an ethylene content of less than 20 wt.-%. In yet an alternative, the least one inner layer comprises, preferably consists of a mixture obtainable by blending the random propylene ethylene copolymer as described above and a styrene ethylene butylene styrene copolymer (SEBS). In all three embodiments the presence of stabilizers in an amount of up to 3 wt.-% and further polymeric components in an amount of up to 3 wt.-% both with respect to the total weight of the inner layer shall be possible as a matter of definition. In other words, "consisting" as a matter of definition shall still allow presence of such minor amounts of stabilizers and polymeric components.

The present invention further provides a process for preparing the inventive multilayer films.

The homo polypropylene or a random propylene ethylene copolymer having a MFR2 (ISO1133, 230° C.) of 2 to 20 g/10 min and a melting temperature (Tm) of above 148° C. for the skin layer and the random heterophasic copolymer for the core layer, as well as the random propylene ethylene copolymer having a melting temperature (Tm) from 132° C. to 144° C. for the inner layer all are made with the catalyst system as described generally in the following.

Thus, the present invention is preferably concerned with a multilayer film, comprising at least a skin layer, a core layer and an inner layer, the skin layer comprising a homo polypropylene or a random propylene ethylene copolymer including up to 2.5 wt.-% units derived from ethylene, the homopolypropylene or the random propylene ethylene copolymer having a MFR$_2$ (ISO1133, 230° C.) of 2.0 to 20 g/10 min and a melting temperature (Tm) of above 148° C., whereby the homo polypropylene or a random propylene ethylene copolymer is obtainable by polymerization in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a selected from
optionally substituted malonates,
maleates,
succinates,
glutarates,
cyclohexene-1,2-dicarboxylates,
benzoates and derivatives and/or mixtures thereof,
citraconate; or
the combination of two internal donors (IDs) being 1,3-diethers and succinates
b) optionally a co-catalyst (Co), and
c) optionally an external donor (ED);
the core layer comprising a mixture obtainable by melt blending
20 to 100 wt.-% of a random heterophasic copolymer and 0 to 80 wt.-% of styrene based TPE,
whereby the random heterophasic copolymer has a melting temperature (Tm) of 134° C.-148° C. and includes a propylene ethylene copolymer rubber; and whereby the styrene based TPE has a styrene content of from 5 to 20 wt.-%, whereby the random heterophasic copolymer is obtainable by polymerization in the presence of
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a selected from
optionally substituted malonates,
maleates,
succinates,
glutarates,
cyclohexene-1,2-dicarboxylates,
benzoates and derivatives and/or mixtures thereof,
citraconate
or
the combination of two internal donors (IDs) being 1,3-diethers and succinates
b) optionally a co-catalyst (Co), and
c) optionally an external donor (ED);
and
the inner layer comprising a random propylene ethylene copolymer having a melting temperature (Tm) from 132° C. to 144° C., whereby the random propylene ethylene copolymer is obtainable by
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a selected from
optionally substituted malonates,
maleates,
succinates,
glutarates,
cyclohexene-1,2-dicarboxylates,
benzoates and derivatives and/or mixtures thereof,
citraconate
or
the combination of two internal donors (IDs) being 1,3-diethers and succinates
b) optionally a co-catalyst (Co), and
c) optionally an external donor (ED);
wherein the multilayer film is free of phthalic acid esters as well as decomposition products thereof.

All preferred embodiments and aspects concerning the catalyst, catalyst system and/or donor as described in the following shall also apply to the embodiment given above.

The catalyst as used for the present invention is
b) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a selected from
optionally substituted malonates,
maleates,
succinates,
glutarates,
cyclohexene-1,2-dicarboxylates,
benzoates and derivatives and/or mixtures thereof,
citraconate
or
the combination of two internal donors (IDs) being 1,3-diethers and succinates
b) optionally a co-catalyst (Co), and
c) optionally an external donor (ED).

Preferably, the internal donor (ID) is a citraconate and more preferably the molar-ratio of co-catalyst (Co) to external donor (ED) [Co/ED] is 5 to 45.

The Ziegler-Natta catalyst (ZN-C) can be further defined by the way as obtained. Accordingly, the Ziegler-Natta catalyst (ZN-C) is preferably obtained by a process comprising the steps of a)
a$_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
or
a$_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or a₃) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of a₂) or a₃) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 13 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from substituted maleates and citraconates. Most preferably the internal donor is citraconate.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 µm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP 2415790, EP 2610270, EP 2610271 and EP 2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

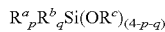

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula Si(OCH$_2$CH$_3$)$_3$(NR$^3$R$^4$)

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor), the latter especially preferred.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] preferably is in the range of 5 to 45, preferably is in the range of 5 to 35, more preferably is in the range of 5 to 25; and optionally (b) the mol-ratio of co-catalyst (Co) to titanium compound (TC) [Co/TC] preferably is in the range of above 80 to 500, preferably is in the range of 100 to 450, still more preferably is in the range of 120 to 350.

For the preparation of the homo polypropylene or the random propylene ethylene copolymer for the skin layer having a MFR2 (ISO 1133, 230° C.) of 2 to 20 g/10 min and a melting temperature (Tm) of above 148° C. the external donor preferably is pentyl dimethoxy silane donor (D-donor) and the cocatalyst preferably is triethylaluminium (TEAL) and the weight ratio of cocatalyst triethylaluminium versus external donor pentyl dimethoxy silane donor (D-donor) preferably is in the range of 11/1 to 14/1, more preferably 12/1 to 13/1.

In a further aspect, the homo polypropylene or the random propylene ethylene copolymer for the skin layer is preferably made in a loop reactor.

For the preparation of the random heterophasic copolymer as used in the core layer the external donor preferably is pentyl dimethoxy silane donor (D-donor) and the cocatalyst preferably is triethylaluminium (TEAL) and the weight ratio of cocatalyst triethylaluminium versus external donor pentyl dimethoxy silane donor (D-donor) preferably is in the range of 8/1 to 4/1, more preferably 7/1 to 5/1. In a further aspect, the random heterophasic copolymer is preferably prepared in coupled loop reactor-gas phase reactor 1-gas phase reactor 2 setup. Further preferably the loop-gas phase reactor 1 are used for polymerization of the random propylene ethylene copolymer forming essentially the matrix.

For the preparation of the random propylene ethylene copolymer having a melting temperature (Tm) from 132° C. to 144° C. as used for the inner layer, the external donor preferably is pentyl dimethoxy silane donor (D-donor) and the cocatalyst preferably is triethylaluminium (TEAL) and the weight ratio of cocatalyst triethylaluminium versus external donor pentyl dimethoxy silane donor (D-donor) preferably is in the range of 6/1 to 3/1, more preferably 5/1 to 3/1. In a further aspect, the random propylene ethylene copolymer having a melting temperature (Tm) from 132° C. to 144° C. as used for the inner layer is polymerized in a loop-gas phase reactor setup with a split of loop/gas phase of 35 to 44 versus 65 to 56% (wt/wt). It is particularly preferred to produce in the loop reactor an intermediate having essentially the same melt flow rate as the final random propylene ethylene copolymer.

The films according to the present invention are made on a multilayer case film line using at least 3 extruders.

The present invention is further concerned with pouches made from the multilayer film as described herein.

For the preparation of the homo polypropylene or the random propylene ethylene copolymer
for the skin layer having a MFR2 (ISO1133, 230° C.) of 2 to 20 g/10 min and a melting temperature (Tm) of above 148° C. the following combination (a) to (d) is preferably used:
  a) external donor: preferably dicyclopentyl dimethoxy silane donor (D-donor)
  b) cocatalyst: triethylaluminium (TEAL)
  c) weight ratio of cocatalyst (triethylaluminium) versus external donor (dicyclopentyl dimethoxy silane donor (D-donor)): in the range of 11/1 to 14/1, more preferably 12/1 to 13/1
  d) production in a loop reactor.

For the preparation of the random heterophasic copolymer as used in the core layer the following combination (a) to (d) is preferably used:
  a) external donor: dicyclopentyl dimethoxy silane donor (D-donor)
  b) cocatalyst: triethylaluminium (TEAL)
  c) weight ratio of cocatalyst triethylaluminium versus external donor dicyclopentyl dimethoxy silane donor (D-donor): 8/1 to 4/1, preferably 7/1 to 5/1
  d) preparation in a coupled loop reactor-gas phase reactor 1-gas phase reactor 2 setup, whereby the matrix is prepared in the loop-gas phase reactor 1.

For the preparation of the random propylene ethylene copolymer having a melting temperature (Tm) from 132° C. to 144° C. the following combination (a) to (e) is preferably used:
  a) external donor: pentyl dimethoxy silane donor (D-donor)
  b) cocatalyst is triethylaluminium (TEAL)
  c) weight ratio of cocatalyst triethylaluminium versus external donor dicyclopentyl dimethoxy silane donor (D-donor): 6/1 to 3/1, preferably 5/1 to 3/1
  d) loop-gas phase reactor setup with a split of loop/gas phase of 35 to 44 versus 65 to 56% (wt/wt)
  e) melt flow rate (MFR2, ISO1133) of the intermediate after the loop reactor deviating from the melt flow rate as the final random propylene ethylene copolymer in less than 10% with respect to the final value, with the values given in g/10 min.

EXPERIMENTAL PART

1. Measuring Methods

The following definitions of terms and determination methods apply for the above general description of the invention as well as to the below examples unless otherwise defined.

Phthalic acid esters and decomposition products Detection is carried out by gas chromatography coupled with one- or two dimensional mass spectrometry (GC-MS respectively GC-MS/MS) optionally preceded by enrichment on a suitable adsorption material. "Free of phthalic acid esters as well as decomposition products thereof" indicates a maximum of 10 μg/kg, i.e. 10 ppb by weight. Typical equipment to be used is for example given in H. Fromme, T. Küchler, T. Otto, K. Pilz, J. Müller, A. Wenzel Water Research 36 (2002) 1429-1438 which is incorporated by reference herewith. Calculation of comonomer content of the second propylene copolymer fraction (R-PP2):

$$\frac{C(PP) - w(PP1) \times C(PP1)}{w(PP2)} = C(PP2) \qquad (I)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
C(PP1) is the comonomer content [in mol-%] of the first propylene copolymer fraction (R-PP1),
C(PP) is the comonomer content [in mol-%] of the random propylene copolymer (R-PP),
C(PP2) is the calculated comonomer content [in mol-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \qquad (I)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
XS(PP1) is the xylene cold soluble (XCS) content [in wt.-%] of the first propylene copolymer fraction (R-PP1),
XS(PP) is the xylene cold soluble (XCS) content [in wt.-%] of the random propylene copolymer (R-PP),
XS(PP2) is the calculated xylene cold soluble (XCS) content [in wt.-%] of the second propylene copolymer fraction (R-PP2), respectively.

Calculation of melt flow rate $MFR_2$ (230° C./2.16 kg) of the second propylene copolymer fraction (R-PP2):

$$MFR(PP2) = 10^{\left[\frac{log(MFR(PP)) - w(PP1) \times log(MFR(PP1))}{w(PP2)}\right]} \qquad (III)$$

wherein
w(PP1) is the weight fraction [in wt.-%] of the first propylene copolymer fraction (R-PP1),
w(PP2) is the weight fraction [in wt.-%] of second propylene copolymer fraction (R-PP2),
MFR(PP1) is the melt flow rate $MFR_2$ (230° C./2.16 kg) [in g/10 min] of the first propylene copolymer fraction (R-PP1),
MFR(PP) is the melt flow rate $MFR_2$ (230° C./2.16 kg) [in g/10 min] of the random propylene copolymer (R-PP),
MFR(PP2) is the calculated melt flow rate $MFR_2$ (230° C./2.16 kg) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \qquad (IV)$$

wherein
w(PP) is the weight fraction [in wt.-%] of the random propylene copolymer (R-PP), i.e. polymer produced in the first and second reactor (R1+R2), w(E) is the weight fraction [in wt.-%] of the elastomeric propylene copolymer (E), i.e. polymer produced in the third reactor (R3)

C(PP) is the comonomer content [in mol-%] of the random propylene copolymer (R-PP), i.e. comonomer content [in mol-%] of the polymer produced in the first and second reactor (R1+R2), C(RAHECO) is the comonomer content [in mol-%] of the propylene copolymer, i.e. is the comonomer content [in mol-%] of the polymer obtained after polymerization in the third reactor (R3), C(E) is the calculated comonomer content [in mol-%] of elastomeric propylene copolymer (E), i.e. of the polymer produced in the third reactor (R3).

$MFR_2$ (230° C./2.16 kg) is measured according to ISO 1133 at 230° C. and 2.16 kg load.

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 285 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950). With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 331157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E \text{ [mol \%]} = 100 * fE$$

The weight percent comonomer incorporation was calculated from the mole fraction:

$$E \text{ [wt \%]} = 100 * (fE*28.06)/((fE*28.06) + ((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \quad (I)$$

wherein

I(E) is the relative content of isolated to block ethylene sequences [in %]; fPEP is the mol fraction of propylene/ethylene/propylene sequences (PEP) in the sample;

fPEE is the mol fraction of propylene/ethylene/ethylene sequences (PEE) and of ethylene/ethylene/propylene sequences (EEP) in the sample;

fEEE is the mol fraction of ethylene/ethylene/ethylene sequences (EEE) in the sample.

Film Thickness

Film thickness was determined according to ISO4593.

The layer thickness distribution in the multilayer films can be detected by any known method, the most preferred ones are microscopes methods, e.g. atomic force microscope (AFM) on the cross section of the multilayer films. Reference is made to A. BIRONEAU et al., Journal of Microscopy, Vol. 264, Issue 12016, pp. 48-58.

Intrinsic viscosity is measured according to DIN ISO 1628/1, October 1999 (in Decalin at 135° C.).

The xylene cold solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

The hexane extractable fraction (C6 soluble) is determined according to the European Pharmacopeia 6.0 EP613. Test bar specimens of 80×10×4 mm³ injection molded at 23° C. in line with EN ISO 1873-2 were used in an amount of 10 g, and the extraction was performed in 100 ml n-hexane by boiling under reflux for 4 h, followed by cooling in ice water for 45 min. The resulting solution is filtered under vacuum in less than 5 min, followed by evaporation under nitrogen stream. After drying the evaporation residue it is weighed and the hexane extractable fraction calculated.

Melting temperature ($T_m$) crystallization temperature ($T_c$) and heat of crystallization ($H_c$): measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. The crystallization temperature is determined from the cooling step, while the melting temperature is determined from the second heating step.

Transparency, haze and clarity were determined according to ASTM D1003-00 on a 200 μm cast film as described herein.

Flexural Modulus: The flexural modulus was determined in 3-point-bending according to ISO 178 on 80×10×4 mm³ test bars injection molded at 23° C. in line with EN ISO 1873-2.

Charpy notched impact strength is determined according to ISO 179 1 eA at 23 and at −20° C. by using an 80×10×4 mm³ test bars injection molded in line with EN ISO 1873-2.

Tensile modulus in machine and transverse direction was determined according to ISO 527-3 at 23° C. on 200 μm cast films produced as described herein. Testing was performed at a cross head speed of 1 mm/min.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

2. Examples

Preparation of the Phthalate Free Catalyst

The phthalate free catalyst used in the polymerization processes for the inventive resins (IE) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl₄, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl₄ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and dicyclopentyl dimethoxy silane (D-Donor) as donor.

The aluminium to donor ratio, the aluminium to titanium ratio and the polymerization conditions are indicated in the respective tables Preparation of the Skin Layer Material The polypropylene used for the skin layer material was prepared in a loop reactor using the catalyst as described above.

TABLE 1

Polymerization conditions used for preparation of the material for the skin layer.

| Donor | dicyclopentyl dimethoxy silane |
|---|---|
| Teal/donor | 12.5/1 (wt./wt.) |
| Teal/C3 | 0.15 kg/ton |
| loop temperature | 75° C. |
| loop pressure | 35Bar |
| Raw polymer | 99.8700 wt.-% |
| stabilization package Irganox 1010FF/ Irgafos 168/synthetic hydrotalcite in weight ratio of 25.6/51.3/23.1 | 0.1300 wt.-% |

The polypropylenes powders were compounded with the desired amount of additives, as indicated in Table 1, in a ZSK 57 twin screw extruder with melt temperature of 200° C. The properties of the materials are shown in Table 2.

TABLE 2

Properties skin layer material

| MFR (2.16 kg, 230° C., ISO 1133) | 8.0 g/10 min |
|---|---|
| Tm (ISO 11357-3) | 163° C. |
| Tcr (ISO 11357-3) | 122 |
| Flexural modulus (+23° C., ISO 178) | 1350 MPa |

TABLE 3

Preparation of the random heterophasic copolymer (RAHECO) for the core layer

| Catalyst | | RAHECO for core layer inventive |
|---|---|---|
| Donor | | as described above dicyclopentyl dimethoxy silane |
| TEAL/Ti | [mol/mol] | 220 |
| TEAL/donor | [mol/mol] | 6.1 |
| Temperature | [° C.] | 31 |
| Loop | | |
| Temperature | [° C.] | 70 |
| Split | [%] | 33 |
| H2/C3 ratio | [mol/kmol] | 0.5 |
| C2/C3 ratio | [mol/kmol] | 5.7 |
| MFR$_2$ | [g/10 min] | 4 |
| XCS | [wt.-%] | 9.8 |
| C2 content | [mol-%] | 4.4 |
| GPR 1 | | |
| Temperature | [° C.] | 80 |
| Pressure | [kPa] | 2500 |
| Split | [%] | 54 |
| H2/C3 ratio | [mol/kmol] | 7.8 |
| C2/C3 ratio | [mol/kmol] | 26.3 |
| MFR$_2$ | [g/10 min] | 6.3 |
| XCS | [wt.-%] | 8.1 |
| C2 content | [mol-%] | 6 |
| GPR 2 | | |
| Temperature | [° C.] | 75 |
| Split | [%] | 13 |
| C2/C3 ratio | [mol/kmol] | 555 |
| H2/C2 ratio | [mol/kmol] | 502 |
| MFR$_2$ | [g/10 min] | 4.9 |
| XCS | [wt.-%] | 20.5 |
| C2 content | [mol-%] | 13.2 |
| IV (XCS) | dl/g | 1.3 |
| Tm | ° C. | 141 |

The polypropylenes powders were compounded with the desired amount of additives (333 ppm of Irganox 1010 (FF); 667 ppm of Irgafos 168, 150 ppm of Magnesium oxide) in a ZSK 57 twin screw extruder with melt temperature of 200° C.

Preparation of Core Layer Material:

The core layer material was made by compounding the RAHECO as obtained above with 10.0, 25.0 or 50.0 wt.-% of Kraton G1645MO based on the total amount of the core-layer material in a ZSK 57 twin screw extruder with melt temperature of 200° C.

Kraton G1645MO is a linear triblock copolymer based on styrene and ethylene/butylene (SEBS) having a melt flow rate (230° C., 2.16 kg) of about 3 g/10 min, a polystyrene content (KM 03 test method) of 11.5 to 13.5 wt. % measured on the polymer.

TABLE 4

Preparation of the random polypropylene copolymer for inner layer material

| Catalyst | | PP-random for inner layer inventive |
|---|---|---|
| Donor | | as described above dicyclopentyl dimethoxy silane |
| TEAL/Ti | [mol/mol] | 220 |
| TEAL/donor | [mol/mol] | 6.1 |
| Temperature | [° C.] | 31 |
| Loop | | |
| Temperature | [° C.] | 70 |
| Split | [%] | 41 |
| H2/C3 ratio | [mol/kmol] | 0.6 |
| C2/C3 ratio | [mol/kmol] | 7.5 |
| MFR$_2$ | [g/10 min] | 1.8 |
| XCS | [wt.-%] | 10 |
| C2 content | [mol-%] | 4.6 |
| GPR 1 | | |
| Temperature | [° C.] | 80 |
| Pressure | [kPa] | 2119 |
| Split | [%] | 59 |
| H2/C3 ratio | [mol/kmol] | 5.8 |
| C2/C3 ratio | [mol/kmol] | 27 |
| MFR$_2$ | [g/10 min] | 1.8 |
| XCS | [wt.-%] | 8.5 |
| C2 content | [mol-%] | 6.2 |

The polypropylene random copolymer of the inner layer was further mixed with Trigonox 101, the amount adjusted by man skilled in the art to reach the final MFR of 8 g/10 min.

TABLE 5

Properties inner layer material

| | |
|---|---|
| MFR (2.16 kg, 230° C., ISO 1133) | 8 g/10 min |
| C2 | 4.5 wt.-% |
| XS | 8.5 wt.-% |
| Tm (ISO11357-3) | 141° C. |

The pelletization was done in a conventional way as well known in the art.

Preparation of the Film

The films according to the present invention have been produced on a multi layer cast film line equipped with 3 extruders. All three extruders were equipped with a notched feeding zone and a 3 zone screw with mixing and shear parts. The diameter of the cylinder of extruder A is 40 mm and the screw length 25D. Extruder B has a cylinder diameter of 60 mm and a screw length of SOD and extruder C a cylinder diameter of 45 mm and a screw length of 25D. Each extruder is fed by a gravimetric dosing system. A feed block with lamellas and following distribution was used as co-extrusion adapter: Extruder A 10% (skin layer), extruder C 80% (core layer) and extruder B 10% (inner layer). A coat hanger die with automatic die gap regulation was used, die width 800 mm and die gap 0.5 mm. The chill roll unit has a diameter of 450 mm and the 2nd cooling roll 250 mm. The detailed processing parameters are shown in tables 6 below.

TABLE 6 processing conditions for three layer cast film

|  |  | Extruder A | Extruder C | Extruder B |
|---|---|---|---|---|
| Layer thickness | micron | 20 | 160 | 20 |
| Layer function and functionality |  | Skin layer Outer protection mainly vs. sterilization | Core layer | Inner layer sealing |
| Melttemperature | ° C. | 250 | 260 | 250 |
| Melt pressure | Bar | 45 | 45 | 45 |
| Screw speed | U/min | 8 | 45 | 6 |
| output | Kg/h | 6 | 48 | 6 |
| Coex adapter temperature |  |  | 260 |  |
| Die temperature |  |  | 250 |  |
| Chill roll temperature | ° C. |  | 12 |  |
| $2^{nd}$ cooling roll temperature | ° C. |  | 21 |  |
| Take off speed winder | m/min |  | 7.4 |  |

The core layer material was varied, i.e. the amounts of Raheco and SEBS were varied from 60 to 100 wt.-% Raheco and 40 to 0 wt.-% SEBS (Kraton G1645MO).

TABLE 7

3 layer cast film composition (inventive/comparative)

|  |  | IE1 | IE2 | IE3 | IE4 | CE1 | CE2 |
|---|---|---|---|---|---|---|---|
| Inventive material for skin layer | wt % | 100 | 100 | 100 | 100 |  |  |
| comparative material for skin layer | wt % |  |  |  |  | 100 | 100 |
| inventive RAHECO for core layer | wt % | 100 | 90 | 75 | 60 |  |  |
| comparative RAHECO for core layer | wt % |  |  |  |  | 60 | 75 |
| Kraton G1645MO | wt % |  | 10 | 25 | 40 | 40 | 25 |
| inventive PP random for inner layer | wt % | 100 | 100 | 100 | 100 |  |  |
| comparative PP random for inner layer | wt % |  |  |  |  | 100 | 100 |

The comparative examples were made with ZN catalysts not having a phthalate internal donor. All other properties were kept the same and optimized as far as possible. The comparative examples insofar did not meet the criteria free of phthalic acid esters as well as decomposition products.

TABLE 8

Film properties determined on 200 μm films

| ... |  | IE1 | IE2 | IE3 | IE4 | CE1 | CE2 |
|---|---|---|---|---|---|---|---|
| Tensile Modulus/MD | MPa | 334 | 244 | 146 | 112 | 111 | 161 |
| Tensile Modulus/TD | MPa | 362 | 268 | 170 | 120 | 123 | 168 |
| Haze/b.s. | % | 5.0 | 4.5 | 4.4 | 3.2 | 7.7 | 6.5 |
| Haze/a.s. | % | 14.7 | 13.9 | 12.9 | 12.7 | 18.1 | 17.1 |
| free of phthalic acid esters/decomposition products |  | yes | yes | yes | yes | no | no | b.s = before sterilization;
a.s. = after sterilization

All inventive examples show excellent haze before and after sterilization. Moreover, it can be seen the incorporation of the styrene based TPE (here KRATON G1645MO) further improves the balance of properties, particularly improves softness and also haze.

It is further a surprising finding of the present invention that the addition of TPE to the specific raheco (for the core layer) decreases haze and simultaneously lowers tensile. For the comparative films originating from traditional ZN catalysts, a reduction in tensile can be observed with increasing TPE amount. However, at the same time haze is deteriorated.

The invention claimed is:

1. Multilayer film comprising
   at least a skin layer, a core layer and an inner layer,
   the skin layer comprising a homo polypropylene or a random propylene ethylene copolymer including up to 2.5 wt. % units derived from ethylene, the homo polypropylene or the random propylene ethylene copolymer having a MFR$_2$ (ISO1133, 230° C.) of 2.0 to 20 g/10 min and a melting temperature (Tm) of above 148° C. measured by DSC according to ISO 11357-3: 1999 and a scan rate of 10° C./min;
   the core layer comprising a mixture obtainable by melt blending 20 to 100 wt. % of a random heterophasic copolymer and 0 to 80 wt. % of styrene based thermoplastic elastomer (TPE),
   whereby the random heterophasic copolymer has a melting temperature (Tm) of 134° C. 148° C. measured by DSC according to ISO 11357-3:1999 and a scan rate of 10° C./min and includes a propylene ethylene copolymer rubber; and
   whereby the styrene based TPE has a styrene content of from 5 to 20 wt. %, and
   the inner layer comprising a random propylene ethylene copolymer having a melting temperature (Tm) from 132° C. to 144° C. measured by DSC according to ISO 11357-3:1999 and a scan rate of 10° C./min,
   wherein the multilayer film is free of phthalic acid esters as well as decomposition products thereof.

2. Multilayer film according to claim 1, whereby xylene cold soluble fraction (XCS) of the random heterophasic copolymer contributing to the core layer has an intrinsic viscosity of 1.0 to 2.0 dl/g (DIN ISO 1628/1, 10/1999; Decalin, 135° C.).

3. Multilayer film according to claim 1, in which the random heterophasic copolymer of the core layer is a random heterophasic copolymer of propylene.

4. Multilayer film according to claim 1, which has a total thickness of 150 to 250 micrometer determined according to ISO4593.

5. Multilayer film according to claim 1, whereby the core layer has a thickness of 70 to 85% with respect to the thickness of the multilayer film.

6. Multilayer film according to claim 1, whereby the thicknesses of the skin layer is 10 to 15% with respect to the total thickness of the multilayer film,
and whereby the thicknesses of the inner layer is 10 to 15% with respect to the total thickness of the multilayer film.

7. Multilayer film according to claim 1, whereby:
the skin layer consists of the homo polypropylene or random propylene ethylene copolymer; and/or
the core layer consists of a mixture obtainable by melt blending 20 to 100 wt. % of a random heterophasic copolymer and 0 to 80 wt. % of styrene based TPE.

8. Multilayer film according to claim 1, whereby:
the inner layer consists of the random propylene ethylene copolymer,
or
the inner layer consists of
a mixture obtainable by blending the random propylene ethylene copolymer and a propylene ethylene elastomer having an ethylene content of less than 20 wt. %;
or the inner layer consists of
a mixture obtainable by blending the random propylene ethylene copolymer and a styrene ethylene butylene styrene copolymer (SEBS).

9. Multilayer film according to claim 1,
whereby the propylene homopolymer of the skin layer has an MFR (230° C., 2.16 kg, ISO1133) of 4.0 to 13 g/10 min,
and/or
a melting temperature of above 162° C. measured by DSC according to ISO 11357-3:1999 and a scan rate of 10° C./min,
and/or
a flexural modulus of above 1450 MPa when measured on injection molded specimens (23° C., 50% humidity, ISO 178),
or
the random propylene ethylene copolymer of the skin layer has,
an MFR (230° C., 2.16 kg, ISO1133) of 4.0 to 13 g/10 min,
an ethylene content of 0.5 to 2.2 wt. %
and/or,
a melting temperature of 152 to 155° C. measured by DSC according to ISO 11357-3:1999 and a scan rate of 10° C./min,
and/or,
a flexural modulus of above 975 MPa when measured on injection molded specimens (23° C., 50% humidity, ISO 178).

10. Multilayer film according to according to claim 1,
whereby the random heterophasic copolymer having a melting temperature (Tm) of 134 to 148° C. measured by DSC according to ISO 11357-3:1999 and a scan rate of 10° C./min contributing to the core layer has,
a $MFR_2$ of 3.0 to 7.0 g/10 min (ISO 1133, 230° C., 2.16 kg)
and/or
a total ethylene content of 7.0 to 14.0 wt. %
and/or
an amount of the xylene cold soluble fraction (XCS) in the range of 18.0 to 25.0 wt. %
and/or
an intrinsic viscosity of 1.0 to 1.6 dl/g (DIN ISO 1628/1, 10/1999; Decalin, 135° C.) of the xylene cold soluble fraction (XCS).

11. Multilayer film according to claim 1,
whereby the propylene ethylene copolymer of the inner layer having a melting temperature (Tm) from 132° C. to 144° C. measured by DSC according to ISO 11357-3:1999 and a scan rate of 10° C./min
has an ethylene content of 3.5 to 6.0 wt. %
and/or
has a melt flow rate of 6.0 to 13.0 g/10 min (230° C., 2.16 kg, ISO1133),
and/or
a flexural modulus of from 600 to 900 MPa when measured on injection molded specimens (23° C., 50% humidity, ISO 178).

12. Multilayer film according to claim 1,
whereby the core layer comprises a mixture obtainable by melt blending 40 to 91 wt. % of a random heterophasic copolymer and 9 to 60 wt. % of styrene based TPE.

13. Multilayer film according to claim 1,
whereby the core layer comprises a mixture obtainable by melt blending 45 to 65 wt. % of a random heterophasic copolymer and 35 to 55 wt. % of styrene based TPE.

14. Pouches made from the multilayer film as defined in claim 1.

15. Process for preparing a film according to claim 1, comprising:
extruding on a multilayer cast film line the components forming the skin layer, the core layer and the inner layer of claim 1.

* * * * *